V. Wassilieff
A. de Witt
INVENTOR

By: Marks & Clerk
Attys.

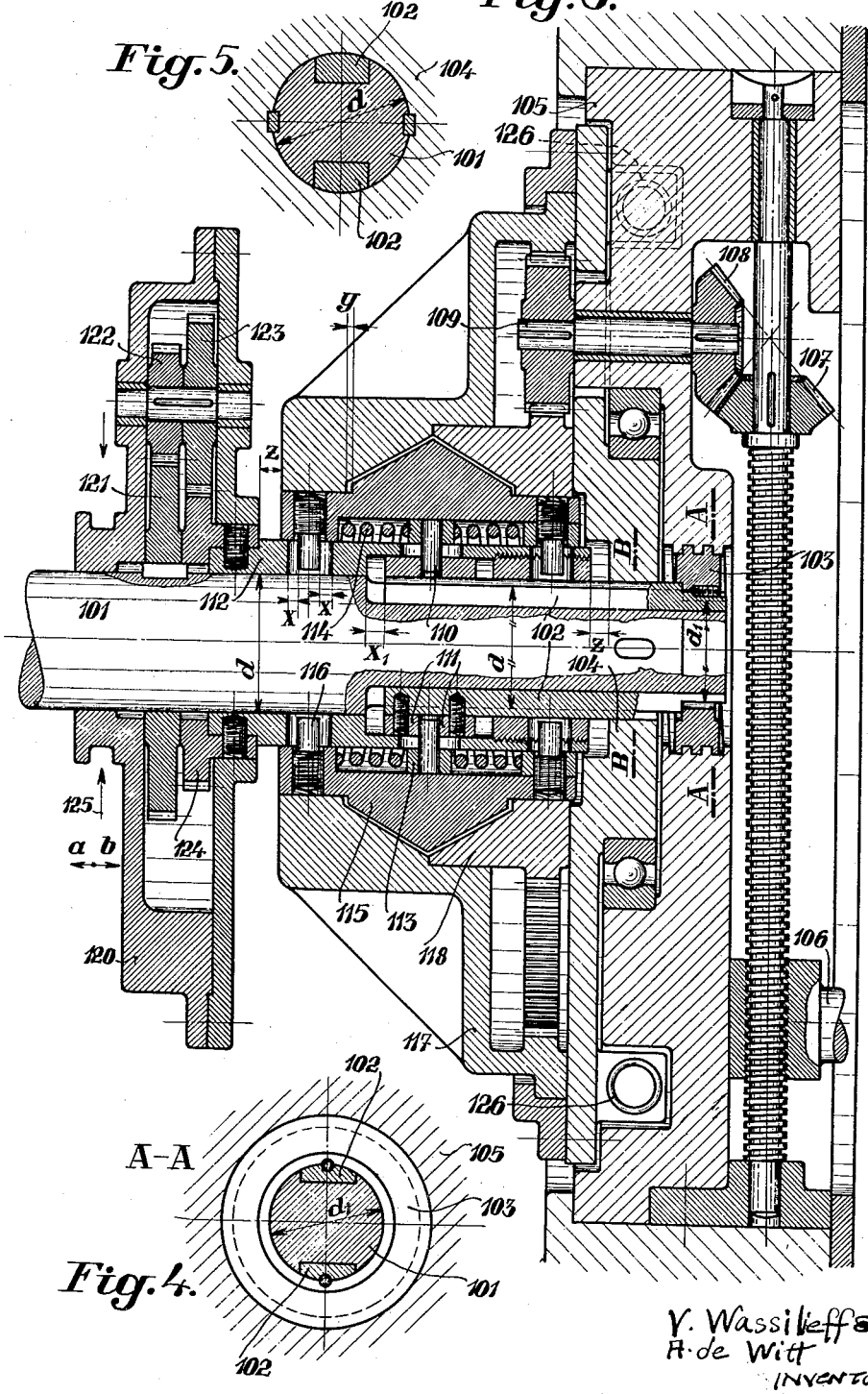

Patented July 25, 1933

1,919,870

UNITED STATES PATENT OFFICE

VIKTOR WASSILIEFF AND ALEXEI DE WITT, OF BRUNN, CZECHOSLOVAKIA

TRANSMISSION GEAR

Application filed July 2, 1931, Serial No. 548,462, and in Germany July 11, 1930.

This invention relates to the known gearing for gradually altering the transmission ratio between the given limits, in which the movement of the driving shaft is transmitted to the driven shaft by means of a pin which is radially adjustable in guides of the driving shaft and one or more ratchet gears.

The subject matter of the invention is a special construction of such gears which differs from the known gears especially on account of the saving of space and the small number of parts.

The invention consists essentially in the construction of those parts of the gear which serve for adjusting the pin in its guides, while the machine is stationary, as well as during the operation.

Figure 1:
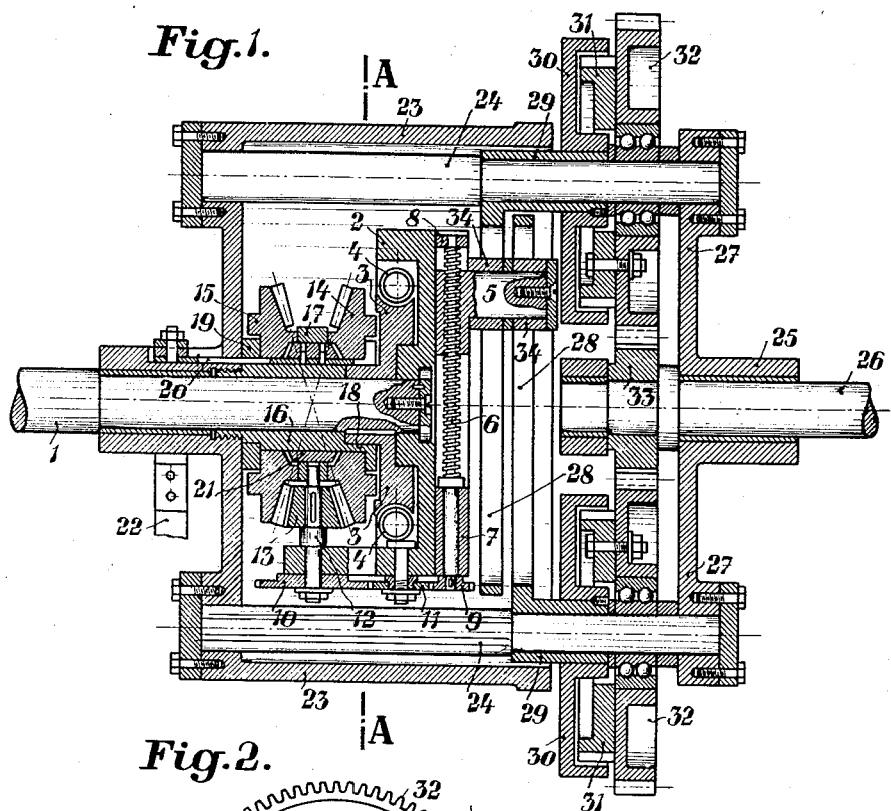
Figure 2:
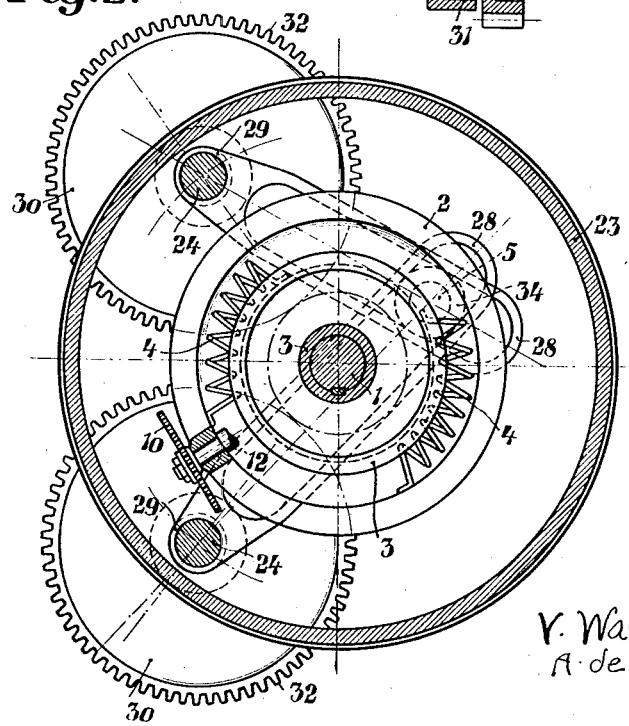

In the accompanying drawings two constructional examples of the invention are illustrated. Figs. 1 and 2 show the first simple constructional form in longitudinal section and in cross section on the line A—A of Fig. 1. Fig. 3 shows the second constructional form in longitudinal section. Fig. 4 is a section along the line A—A of Fig. 3 and Fig. 5 is a section along the line B—B of Fig. 3.

At the free end of the driving shaft 1 in the constructional form according to Figs. 1 and 2, is arranged a freely rotatable disc 2 and a fixed disc 3. The discs 2 and 3 are connected together by helical springs 4 under tension or compression, which lie in the channels provided in the circumference of the disc 3. In the end surface of the free disc 2 a guide for the pin 5 is worked, of which the part which is constructed as a fang is guided by means of a thread on a screw spindle 6. The spindle 6 is rotatably mounted at both ends in bearings 7 and 8, which are rigidly connected with the disc 2. On the end of the spindle 6, which is extended beyond the bearing 7, there is keyed a toothed wheel 9 which engages by means of an intermediate member 11 with a toothed wheel 10 of the same size, the toothed wheel 10 is keyed to a short shaft 12 mounted on the other end to which is secured a bevel wheel 13 engaging with the bevel wheels 14 and 15. The bevel wheels 14 and 15 are mounted so as to be freely rotatable on a part 16 rigidly connected with the bearing of the shaft 1, and are prevented from axial displacement by a ring 17, the shoulder 18 of the part 16 and a ring 19. In a longitudinal groove of the part 16 a longitudinal groove joining this groove in the bearing of the shaft 1 is guided a pulley rod 20, to which is secured a brake ring 21 which, when the rod 20 is displaced, can be brought into engagement with the toothed wheels 14 or 15, and so prevents one or the other wheel from rotating freely, but in the middle position allows both wheels to be turned by the bevel 13 rotating with the disc 2. The adjustment of the brake ring 21 is effected by means of a lever 22 or the like.

With the bearing of the shaft 1 is connected a cylindrical casing 23, in which are secured two or more axles 24, the other ends of which are secured in a disc 27 connected with the bearing 25 of the driven shaft 26. On each of these axles 24 a slotted lever 28 is mounted so that it can swing, the nave 29 of which is rigidly connected with the one part 30 of a clutch 30, 31 of any desired construction which can only be engaged in one direction. The clutch member 31 is screwed to a toothed wheel 32, which transmits the movements of the clutch member 31 to a toothed wheel 33 keyed to the driven shaft.

In order to diminish the friction between the pin 5 and the levers 28, sliding rings 34 may be slipped over the pin 5.

It is clear that by a gradual radial displacement of the pin 5 the stroke of the levers 28, and thereby also the engaging movement of the clutch member 31, can be gradually varied, and consequently also can the transmission ratio be continuously varied.

The radial displacement of the pin 5 may be effected in two ways either by hand, the one of the bevel wheels 14, 15 being braked by displacement of the brake ring 21, so that then the bevel wheel 13 runs round the fixed bevel wheel and the spindle 6 turns in one or other direction, or automatically when the load fluctuates.

In the constructional form according to

Fig. 3, there are made in the driving shaft 101 of diameter $d$ one or more axial grooves, in which are laid sliding rods 102 with a certain axial play, which, in spite of the end of the shaft 101 being of a smaller diameter, are of the same height over their whole length. In a recess of the rod 102, which reaches up to the smaller diameter $d_1$ of the shaft 101, there is secured a ring 103 which has a flat thread on its outer periphery. On the shaft 101 is secured a disc 104, on which, by means of ball rings or the like, a free disc 105 is guided, which in its boring has a flat thread which engages with the ring 103, and is itself prevented from axial displacement. The two discs are connected together by means of helical springs 126 under pressure or tension in the same manner as the springs 4 connect the discs 2 and 3 in the embodiment shown in Figs. 1 and 2. The pin 106 which is displaceable, for example, on a screw mounted in the disc 105 in a radial recess thereof and which is constructed as a fang, can be adjusted by means of the pair of bevel wheels 107 and 108, and wheel 109 keyed on to the same spindle. The spindle of the two wheels 108, 109 is mounted in the disc 105 and passes through a segment like aperture in the disc 104. On the rod 102 are placed two rings 111, which prevent the axial displacement in the longitudinal direction of the rods 102 of some pins 110 set in a ring 113. A bush 112 freely rotatable on the shaft 101 and axially slidable within certain limits, has on the inside a recess in which the rings 111 are guided. The pins 110 engage in axial slots of the bush 112 and are set in a ring 113 which is held in its middle position by means of two pieces of similar springs 114 under pressure. The springs 114 bear with their other ends against the inner part of a double wedge ring 115. Pins 116 screwed into the double wedge ring 115 engage with their free ends in the axial slots of the bush 112. Consequently the speeds of rotation of the bush 112 and the ring 115 are equal.

On the double wedge 115, two wheels 117 and 118 are mounted, so as to be freely rotatable, which engage from above and below with the toothed wheel 109. In order that the radial position of the pin 106 may be accurately adjusted, there is arranged on the shaft 101 a freely rotatable and axially displaceable box 120, in which four toothed wheels are built in such a manner that when the box 120 is displaced axially, they are carried with it. Of these wheels, the toothed wheel 121 is connected with the shaft 101 by means of a key and keyway, while the toothed wheel 124 can rotate freely on the shaft 101; this wheel is screwed to the bush 112. The toothed wheels 122 and 123 are keyed to a common spindle which is mounted so as to be freely rotatable in the box 120. The ring 115 is made in two parts to simplify the construction of the machine.

The result of this arrangement is that with the automatic regulation of the speed of rotation (which is derived from the actual load of the machine) the relative rotation of the discs 104 and 105 causes an axial displacement of the rod 102 by means of the nut and the ring 103. The pins 110 are also displaced and destroy the equilibrium of the two springs 114, and in this way couple the wedge ring 115 with one or other toothed wheel 117 or 118. It is clear that in this as also in the following case of the regulation of the speed of rotation of the gear, the rotation of the regulating box on the shaft 101 is to be prevented, which can easily be effected by means of a band or clamping brake or the like. When the box 120 is released, the wedge ring 115 turns equally quickly with the disc 105, and, in this case, therefore the regulation of the speed of rotation of the gear is impossible.

When the speed of rotation is regulated by hand during the operation, the lever 125 is brought into the direction $a$ or $b$, so that the whole box with bush 112 and one ring 115 is displaced to left or right.

For this purpose the axial play must be made as follows:

$$X > Y;\ X + Y < Z;\ Y < X\ 1.$$

In this manner of regulating the speed of rotation of the gear the automatic adjustment of the speed of rotation in case of need may be assisted by hand, since by means of the lever 125 the speed of rotation of the machine actually necessary can always be obtained apart from the load of the machine.

When the gear is stationary, the desired speed of rotation with which the operation is to be started is obtained only by turning the whole regulating box 120 and the shaft 101 and the position of the lever 125.

This regulation has the following advantages in addition to those referred to. When, for example, apart from the variable load of the gear a constant speed of rotation of the driven shaft is required the gear is adjusted by means of the gear 125 and the desired speed of rotation of the box 120 is simply released and the speed of rotation remains constant.

The transmission of the movement of the pin 106 to the driven shaft can be effected in any desired manner.

What we claim is:

1. A variable speed gear mechanism, comprising in combination a driving shaft, a driven shaft, a driving disc fixed on said driving shaft, a crank disc rotatable on the driving shaft, springs connected to said driving disc and crank disc for resiliently transmitting rotary motion from the former to the latter, a crank-pin radially adjustable on said crank disc, an adjusting screw spindle for said crank pin on said crank disc, means for turning said screw spindle including a gear wheel fixed on said spindle, a wedge ring encircling the driving shaft and capable of axial displacement, a pair of axially non-displaceable gear members rotatable on the driving shaft and having counterpart wedge surfaces one on each side of said double wedge ring, so as to be capable of being locked alternately by the wedge ring on axial displacement of the latter, a gear wheel rotatable on the crank disc and meshing with said gear members on the driving shaft, said gear wheel operatively connected to the gear wheel on the screw spindle, said crank disc having a central axial screw-threaded opening, displacing means for said double wedge ring axially slidable on the driving shaft and non-rotatable thereon, a screw threaded ring connected to said displacing means and engaging in said screw threaded opening in the crank disc so as to be displaced axially on relative rotation occurring between the driving disc and crank disc, a stationary casing having a plurality of pivots thereon spaced round the axis of the driving shaft, slotted rocking levers mounted on said pivots with the slots of the levers in engagement with said crank pin, gear wheels rotatable on the said pivots, one way clutches connected to said slotted levers and gear wheels for transmitting rotary motion from the levers to the gear wheels and a gear wheel on the driven shaft and in engagement with the gear wheels on the said pivots.

2. A variable speed gear as set forth in claim 1, in which the double wedge ring has an annular recess therein, the driving shaft has axial grooves and the displacing means for the double wedge ring comprise rods slidable in said grooves and secured to the screw-threaded ring so as to be displaceable axially with the screw threaded ring, rings secured to said rods spaced axially thereon and encircling the driving shaft, a ring encircling the driving shaft and axially displaceable in the recess in the double wedge ring, pins set in the said ring and extending between the rings on the said rods and compression springs in the annular recess, arranged one on each side of the ring therein with their ends bearing respectively against the sides of the ring and the opposed walls of the recess.

3. A variable speed gear as set forth in claim 1, having braking means for the double wedge ring comprising a casing rotatable and axially slidable on the driving shaft, a gear wheel inside said casing encircling the driving shaft and connected to the double wedge ring so as to be capable of rotating therewith, a gear wheel inside the casing fixed to the driving shaft, gear wheels inside the casing meshing with the gear wheels fixed to the driving shaft and connected to the wedge ring for operatively connecting the former gear wheel to the latter, the casing being capable of engagement by a brake member, for the purposes set forth.

4. A variable speed gear as set forth in claim 1, having braking means for the double wedge ring comprising a casing rotatable and axially slidable on the driving shaft, a bush slidable on the driving shaft and freely rotatable thereon, said bush having axial slots therein, pins secured to the double wedge ring and extending in said slots so as to be capable of preventing relative rotary motion between the wedge ring and the bush, said slots having a length such that, in the inoperative position of the wedge ring out of contact with the wedge surfaces on the gear members on each side thereof, the pins are spaced from the ends of the slots by an amount exceeding the clearance between the wedge ring and said wedge surfaces, a casing rotatable on the driving shaft, a gear wheel inside said casing encircling the driving shaft and secured to the said bush, a gear wheel inside the casing fixed to the driving shaft, gear wheels inside the casing meshing with the gear wheels fixed to the driving shaft and connected to the wedge ring for operatively connecting the former gear wheel to the latter, the casing being capable of engagement by a brake member, said casing being capable of axial displacement by an amount exceeding the sum of the spacing of the ends of the slots from the pins therein and the distances of the wedge surfaces on the gears from the double wedge ring in the inoperative position of the latter, so as to enable the wedge ring to be moved into operative contact with the said wedge surfaces by displacing the casing axially, said bush having axial slots therein for the pins extending between the rings on the rods connected to the screw-threaded ring with the ends of the said slots spaced from the said pins by an amount exceeding the spacing of the pins in the first-mentioned slots from the pins therein, for the purposes set forth.

VIKTOR WASSILIEFF.
ALEXEI DE WITT.